Patented Nov. 7, 1950

2,529,414

UNITED STATES PATENT OFFICE 2,529,414

PROCESS OF PREPARING STABLE VINYL COATINGS ON METAL SURFACES

Edward C. Pfeffer, Jr., Troy, N. Y., assignor to Continental Can Company, Inc., New York, N. Y., a corporation of New York No Drawing. Application May 21, 1943, Serial No. 487,972

4 Claims. (Cl. 117—49)

It has been proposed to employ lacquers and enamels containing vinyl resins as coating compositions for metal surfaces.

Vinyl acetate, vinyl butyral, and like non-halogen vinyl polymers can be baked without decomposition while in contact with metal surfaces, but the films are not resistant to water: for example, if used as the lacquer on containers for foodstuffs which require processing, that is, heating in the presence of moisture, the lacquer film does not stand up against penetration, and tends to separate from the surface. Hence, the usual polyvinyl lacquers are comprised of mixtures containing major proportions (e. g., 65 to 93 percent) of a vinyl halide such as vinyl chloride, in the form of copolymers or interpolymers with other vinyl resins. Such lacquers provide films which exhibit a high degree of toughness and flexibility and excellent adherence when properly baked.

However, at the temperatures required for adequate baking to obtain these properties (i. e., which are necessary for eliminating the solvent and for obtaining adhesion), the vinyl halide polymers react with metals such as tin and iron when either a pure halide or one of the aforesaid mixtures is used. This reaction appears as a brown discoloration beginning at a temperature around 305 degrees F. (i. e., at the lowest practicable baking temperature), and becomes increasingly evident at temperatures of 305 to 325 degrees F.; a nine minute bake at 360 degrees F., for example, results in a total loss of the film by the formation of cracks and by peeling. It is probable that this decomposition occurs by an interaction of the polyvinyl halide with the elemental metal, with a release of halide from the resin in the form of hydrogen halide which is then effective for further catalyzing the decomposition.

To avoid this defect, it has heretofore been the practice to insulate the vinyl resin film from the metal by providing a protective undercoating either as a separate priming operation, or by employing a preferentially stratifying lacquer having a resinous polar component which interposes itself as an insulating or separating layer between the metal and the vinyl resin during the operations of application and baking. Another form of practice is to employ an insulating film of phosphate material or the like.

It has been found, however, that such undercoatings may be dispensed with, and coated sheets capable of mechanical working are obtained, if the metal surface is provided preliminarily with a tightly adherent coating of anhydrous oxides. This can be effected in various ways: but care must be taken to avoid the formation of the usual rust coat upon ferrous surfaces such as results from the usual atmospheric oxidation, as this normal rust is not effective for the purpose and is both hydrous and also powdery so that it rubs off. Such adherent coatings upon steel or black plate may be obtained by heating or pre-baking the clean plate at 400 to 500 degrees F., and can be carried to temperatures at which "temper colors" appear, being brown to purple or blue; this heating resulting in the formation of anhydrous ferric or ferro-ferric oxides in adherent form and of microscopic thinness. The actual thickness of this oxide film appears to have little influence so long as it is continuous, tightly adherent and of anhydrous type.

Tin plate is similarly active when in contact with such vinyl halide resin films. Here likewise the difficulty may be overcome by heating in the presence of an oxidizing atmosphere until a thin continuous tightly adherent oxide film is established: and for this purpose, the film may be so fine that essentially no change in appearance of the tin plate occurs. For tin plate which has been coated by hot dipping, e. g., immersion in molten tin usually beneath a fluxing and protective layer of palm oil, the operation may be conducted by removing the oil by cleaning with solvents or by mechanical polishing, and then heating to temperatures of 350 to 500 degrees F. in air or other oxidizing medium. For tin plate which has been coated electrogalvanically, the operation may be conducted by rinsing the tin plate, and heating to 450 degrees F. or slightly above for effecting a fused bonding of the tin to the underlying metal surface and an establishment of a continuous tin coating layer, in the presence of air or other oxidizing medium to effect the superficial oxidation. The operation may also be effected by heating a non-oxidizing atmosphere to effect the fusion, and then permitting the sheet to cool in air so that the oxidation occurs before the sheet returns to room temperature.

Since such heating operations do not permit the formation of hydrated oxide, no particular care as to the absence of water vapor need be observed; but it is preferred to coat promptly after the oxide film has been established, both to prevent possible continuance of oxidation in the hydrated form and also to assure against mechanical damage by which the established film may be displaced and the elemental metal exposed.

Another way of preparing a protective oxide film is by electrolytic oxidation or anodizing of the metal surface, for example in aqueous bath, followed promptly by rinsing and drying to avoid degeneration of the tight electrolytic oxide film into a loose hydrous one. Further, the oxide coating can be produced by employing oxidizing solution, and similarly rinsing and drying forthwith to avoid hydrolysis of the oxide coating.

These operations of preparing the oxide film may be accomplished at the rolling or plating mill, by which the immediate application of the lacquer coating assures the plate against deterioration prior to its fabrication; or the operations may be conducted immediately prior to the fabrication of the material. When the articles are to be formed from metal forms other than sheets, likewise, the metal may be treated at any desired stage, after having appropriately cleaned the surface to assure the definite production of a continuous adherent oxide film.

The temperature employed in preparing the oxide by a heating operation should be one at which a continuous film of anhydrous oxide is produced, in the case of metal having a ferrous base, i. e., a temperature in excess of around 400 degrees F.; and should be within the aforesaid range of 350 to 500 degrees F. in the case of tin plate.

The lacquer coating which can be effectively employed upon such treated metal surfaces contains a polyvinyl resin of the structural formula $(CH_2:CAX)_n$, in which $n$ denotes polymerization and either or both A and X consist at least in dominant part of halogen or a radical which releases halogen under the conditions of baking, as it is such resins, including a polymerized vinyl halide, which have the virtue of high resistance when properly baked but also have the defect of burning at the relatively low temperature required for adequate baking. These resins therefore include the polyvinyl chlorides, polyvinylidene chlorides, polyvinyl chloracetates and corresponding resins formed with other halides, other halogenated acids, and other halogenated vinyl groups which release the halogen, e. g., as hydrogen halide, during baking in contact with elemental metal.

These resins include both the products formed by polymerizing a single progenitor of such types, and also the complex resins produced by polymerizing one or more such progenitors in the presence of other resinous or resinifying substances to form the so-called copolymers or interpolymers, or produced by mixing such products with other resins for obtaining the so-called mixed polymers. In each case, however, the invention is of value and applicable when the resin present reacts with elemental metal surfaces at the elevated temperatures requisite for baking and is thereby degraded, and hence such resins are herein referred to and claimed as "metal-decomposable synthetic resins" to distinguish them from those synthetic resins or mixtures of synthetic resins with other materials which do not decompose under such conditions.

These polyvinyl halide resins may be employed in mixture with other components, such as polyvinyl esters, vinyl acetates, polyvinyl alcohol, polyacrylic and polyalkylacrylic esters, etc., which themselves do not have the defect of damage when heated alone in the presence of elemental metal, but which form compositions with polyvinyl halides which are susceptible to the damage. The ratio of proportions may be selected as desired, but it is present preference to employ high quantities and ratios of polyvinyl halide, for the reason that the same are highly impermeable and non-reactive to aqueous solutions and vapor. These mixtures may be prepared in the form of conjoint solutions in an organic solvent, or may be of molecularly associated type by conjoint polymerization; and thus includes both copolymers and interpolymers.

A particular advantage of the present procedure is that it is possible to employ the polyvinyl halides of relatively low molecular weight, and to effect a further condensation or polymerization thereof during the course of the baking operation.

As a specific example of employment, a commercial polyvinyl resin of the type known as Vinylite VYHH, being an interpolymer of about 87 percent of vinyl chloride with 13 percent of vinyl acetate, was employed. The metal base was hot dipped tin plate which had been oxidized by electro-anodizing. 20 pounds of the vinyl resin was dissolved in 24 pounds of isophorone and 56 pounds of xylol. This lacquer was employed for roll-coating the tin plate, and was then baked at a temperature of 345 to 360 degrees, employing 4 to 6 minutes as a come-up time, a baking for 10 minutes at the temperature and a come-down time of 1 to 2 minutes. The coating was clear, without browning, and manifested no defects of peeling nor did it show under-film corrosion on accelerated test.

A similar mixture of 20 pounds of the vinyl resin, dissolved in 80 parts of hexone, likewise provided an excellent film under similar conditions of baking.

As a matter of comparison, a lacquer of vinyl copolymer resin of vinyl chloride and vinyl acetate was applied to an anodized tin plate and baked at 360 degrees F. for 9 minutes without burning or decomposition; while a plain specimen of the tin plate, to which an identical coating was applied, demonstrated bad burning and decomposition when baked at 360 degrees F. for 9 minutes. With electro-anodized specimens of the tin plate, coated with the same lacquer, baking at 375 degrees F. for 9 minutes showed at most a trace of spot burning; while the coating, applied and baked under identical conditions upon the plain specimen, was completely decomposed. Where the tin plate was very heavily electro-anodized, the lacquer could be applied and baked at even 400 degrees F. for 9 minutes without decomposition; while comparison specimens without anodizing had their coatings burnt and shrivelled into narrow curled strips until almost total metal exposure resulted. A corresponding vinyl resin enamel, which also contained titanium oxide as a white pigment, was applied to a clean deoxidized steel plate and baked at 340 degrees F.; the product was badly burnt and a dark gray in color: while a steel plate, pre-oxidized by baking, had its coating of such enamel in unburnt condition and retained its white color when baked at 340 degrees. When three steel plates of like history were employed (a) as the deoxidized steel plate received from the mill, (b) electro-cleaned deoxidized steel plate, (c) deoxidized steel plate pre-baked at 410 degrees F. for 20 minutes, it was found upon coating with a vinyl copolymer lacquer as above and baking each for 14 minutes total time at 365 degrees, that specimen (b) was badly burnt, and specimen (a) was discolored and burnt to a condition unsatisfactory for employment, while specimen (c) showed no burning or decomposition at all.

A white-pigmented lacquer film was prepared upon black plate by cleaning the same chemically, rinsing and drying, and oxidizing at 425 degrees F. to provide a brownish oxide film. This was then coated with a lacquer consisting of 20 pounds of the aforesaid vinyl resin, 10 pounds of titanium dioxide, 27 pounds of isophorone and 63 pounds of xylol. This was then baked at a temperature between 345 and 360 degrees, under the aforesaid time conditions; and gave an excellent resistant film which was opaque and demonstrated a clear, white color.

Where considerable fabrication is to be practiced upon the metal, it may be advisable to add a plasticizer to the vinyl resin, as by the employment of 10 to 20 percent of the vinyl resin complex in the form of diamylphthalate, dibutyl cellosolve phthalate or the like.

In general, the provision of a continuous anhydrous oxide film permits employment of baking temperatures of 20 to 40 degrees F. or more higher than are endured by coatings upon bare metal plates in the absence of the insulating film.

It is obvious that the invention is not limited to these forms of practice, but may be employed in other ways within the scope of the appended claims.

I claim:

1. The process of preparing a stable continuous coating upon an article having a surface provided by a metal selected from the group consisting of iron and tin, said coating including a lacquer base containing polyvinyl halide which is decomposable by heating in contact with said metal at a temperature between about 305 degrees F. and 335 degrees F., which comprises heating the metal to at least 350° F. in an oxidizing atmosphere to provide a thin tightly adherent continuous film of anhydrous oxide of said metal, directly coating said film of anhydrous oxide with a solution in volatile solvent of said lacquer base, and baking at a temperature of 335 to 380 degrees F.

2. The process of preparing a stable continuous coating upon an article having a surface provided by a metal selected from the group consisting of iron and tin, said coating including a lacquer base containing polyvinyl halide which is decomposable by heating in contact with said metal at a temperature between about 305 degrees F. and 335 degrees F., which comprises heating the surface of the metal to a temperature of at least 350 degrees F. in an oxidizing atmosphere whereby to provide a thin tightly adherent continuous film of anhydrous oxide of said metal, directly coating said film of anhydrous oxide with a solution of said polyvinyl lacquer base in a volatile solvent, and baking at a temperature of 335 to 380 degrees F. with the polyvinyl halide in contact with said film of anhydrous oxide.

3. The process of preparing ferrous base plate having a baked protective lacquer coating thereon including polyvinyl halide which is decomposable by heating in contact with iron at a temperature between about 305 degrees F. and 335 degrees F., which comprises heating the plate in an oxidizing atmosphere to at least 400 degrees F. and thereby effecting the formation of a thin tightly adherent continuous superficial film of anhydrous oxide, directly coating said film of anhydrous oxide with a lacquer coating containing a polyvinyl halide in a volatile organic solvent, and baking at a temperature of 335 to 380 degrees F.

4. The process of preparing tin plate having a baked protective lacquer coating thereon including polyvinyl halide which is decomposable by heating in contact with tin at a temperature between about 305 degrees F. and 335 degrees F., which comprises heating the plate in an oxidizing atmosphere to at least 350 degrees F. and thereby effecting the formation of a thin tightly adherent continuous superficial film of anhydrous oxide, directly coating said film of anhydrous oxide with a lacquer coating containing a polyvinyl halide in a volatile organic solvent, and baking at a temperature of 335 to 380 degrees F.

EDWARD C. PFEFFER, Jr.

REFERENCES CITED

The following references are of record in the file of this patent:

UNITED STATES PATENTS

| Number | Name | Date |
|---|---|---|
| Re. 862 | Butcher | Dec. 6, 1859 |
| 1,827,204 | Mason | Oct. 13, 1931 |
| 1,990,009 | Stiles | Feb. 5, 1935 |
| 2,125,387 | Mason | Aug. 2, 1938 |
| 2,217,451 | Patnode | Oct. 8, 1940 |
| 2,362,397 | Pearce | Nov. 7, 1944 |

FOREIGN PATENTS

| Number | Country | Date |
|---|---|---|
| 385,582 | Great Britain | Mar. 23, 1931 |
| 433,367 | Great Britain | Aug. 13, 1935 |